(12) United States Patent
Laffisse

(10) Patent No.: US 6,195,599 B1
(45) Date of Patent: Feb. 27, 2001

(54) METHOD AND DEVICE FOR DECOUPLING OF THE BEHAVIOR OF AN AIRCRAFT, PARTICULARLY A HELICOPTER

(75) Inventor: Jean-Francois Michel Laffisse, Marseilles (FR)

(73) Assignee: Eurocopter, Cedex (FR)

(\*) Notice: Subject to any disclaimer, the term of this patent is extended or adjusted under 35 U.S.C. 154(b) by 0 days.

(21) Appl. No.: 09/166,428

(22) Filed: Oct. 5, 1998

(30) Foreign Application Priority Data

Oct. 6, 1997 (FR) .................................................. 97 12419

(51) Int. Cl.[7] .................................................. B64C 27/57
(52) U.S. Cl. ............................................ 701/3; 277/17.11
(58) Field of Search ...................... 701/3, 4; 244/17.11, 244/17.13

(56) References Cited

U.S. PATENT DOCUMENTS

| 5,001,646 | 3/1991 | Caldwell et al. ........................ 701/7 |
| 5,678,786 | * 10/1997 | Osder ................................ 244/17.13 |

FOREIGN PATENT DOCUMENTS

2073114A  * 10/1981  (GB).

OTHER PUBLICATIONS

Liceaga–Castro et al., "Helicopter Flight Control Using Individual Channel Design", IEEE Proceedings: Control Theory and Applications, vol. 142, No. 1, Jan. 1995, pp. 58–72.

Spurgeon, S. K. et al., "An Assessment of Rubustness of Variable Structure Control Systems for Advanced Aircraft Manoeuvres" IEEE Proceedings: Conference on Decision and Control, Dec. 5–7, 1990, vol. 6, pp. 3588–3593.

Jones et al., "Fuzzy Control of a Three Fin Torpedo", IEEE Proceedings: American Control Conference, May 1990, vol. 2, pp. 1474–1478.

French Search Report dated May 22, 1998, 3 pages.

\* cited by examiner

Primary Examiner—Michael J. Zanelli
Assistant Examiner—Eric M Gibson
(74) Attorney, Agent, or Firm—Marshall, O'Toole, Gerstein, Murray & Borun

(57) ABSTRACT

An apparatus and method for decoupling of the behavior of an aircraft which may determine a first control demand that is representative of the actuation of a control member, determine a transfer function that is representative of the behavior of an aircraft upon actuation of the control member, determine a second control demand that is capable of generating a decoupling based at least on a partial inversion of the transfer function and a non-inverted part of the transfer function, calculate an overall demand from the sum of the first and second control demands, and apply the overall demand to the aircraft.

12 Claims, 1 Drawing Sheet

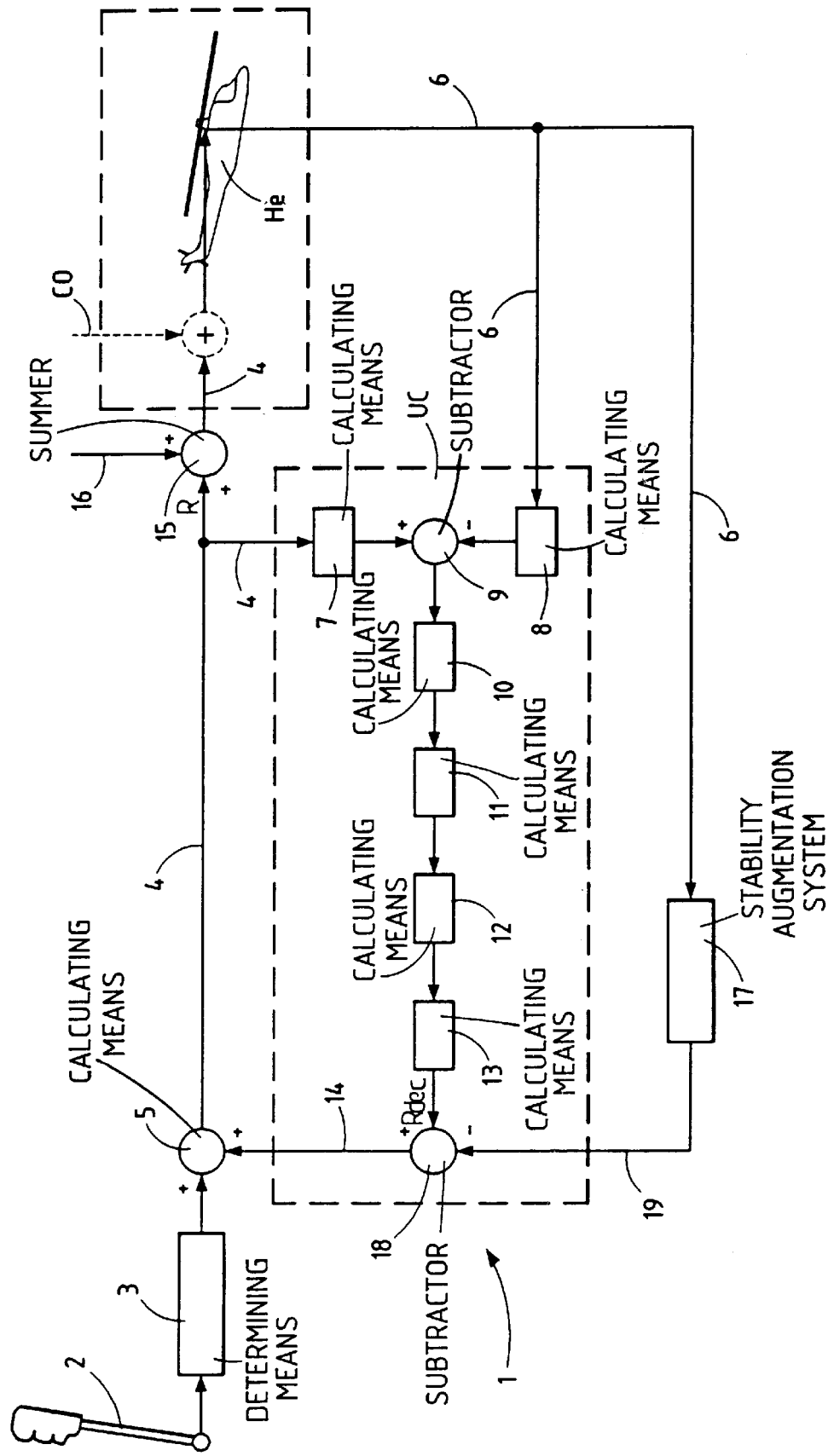

METHOD AND DEVICE FOR DECOUPLING OF THE BEHAVIOR OF AN AIRCRAFT, PARTICULARLY A HELICOPTER

BACKGROUND OF THE INVENTION

The present invention relates to a method and a device for decoupling of the behavior of an aircraft, particularly a helicopter.

In the context of the present invention, coupling of the behavior is understood to mean the interaction which exists between various controls and/or attitudes of an aircraft, such that a change to a control (for example the actuation of the pitch control column of a helicopter with a view to altering the pitch trim) or of an attitude entails not only an associated corresponding alteration of the behavior of the aircraft (representative of the said change), but also moreover an interfering action generated on other attitudes.

Hence, a method or a device for decoupling of the behavior of an aircraft, in the context of the present invention, represents a method or a device intended, upon a change to a particular attitude or to a control, to eliminate the interfering action arising from the coupling of the aircraft.

It is known that, on a helicopter, the couplings of the behavior thereof are many and are essentially of two different origins, namely control couplings and axis couplings.

In a known way, the control couplings exhibit very clear-cut and instantaneous effects after action on the controls. A characteristic example is the collective-pitch/yaw coupling. The lift of the main rotor keeps the helicopter in the air. The drag of the rotor blades creates, by reaction, a torque which tends to make the helicopter turn in yaw. In the equilibrium state, this torque is compensated for by that generated by the rear rotor. Hence, if the position of the collective pitch is altered, the drag of the main rotor blades is also altered, and an interfering torque is created, generating the onset of yaw.

Moreover, in a known way, the axis couplings are of very varied origins and exhibit a significant effect appearing after the alteration to the flight configuration, for example a change of speed, incidence or sideslip. A characteristic example is the rotor/empennage interaction. It is known that, between about 50 km/h and 150 km/h, an empennage in the low position lies within the downwash from the rotor. This results in an increase in the pitch-up moment (and of the roll if the empennage is asymmetric).

These couplings of the behavior of the aircraft are consequently very troublesome.

Various methods intended to limit these couplings are known, particularly:

the control coupling can be combated by flat-rate control decoupling. In the case of the "collective-pitch/yaw" decoupling, the movement of the collective lever causes a proportional movement of the yaw control, which is added to the yaw control generated by the pilot of the aircraft; and the axis decoupling can be performed by a flat-rate feedback to the controls of parameters measured in flight, such as the lateral and vertical load factors, for example.

However, in practice, by reason of the complexity of the phenomena at play, these methods at best make it possible to attenuate the effect of a limited number of couplings. None of the preceding solutions is therefore totally satisfactory for overall decoupling.

SUMMARY OF THE INVENTION

The object of the present invention is to remedy these drawbacks. It relates to a method and a device making it possible to decouple the behavior of an aircraft, particularly of a helicopter, in a robust way, that is to say being capable of being adapted to all the types of couplings likely to exist, throughout the entire flight envelope of the aircraft, while observing the situations relating to the perception of control margins (replication, via the position of the controls, of the position of the control surfaces in the medium term).

According to the invention, the method for decoupling of the behavior of an aircraft, particularly of a helicopter, is noteworthy in that:

a) a first control demand is determined, representative of the actuation of a control member;

b) a transfer function is determined, representative of the behavior of the aircraft upon actuation of the control member;

c) at least on the basis of a partial inversion of the said transfer function and of that part of the transfer function not taken into account by the partial inversion, a second control demand is determined, capable of generating the decoupling;

d) an overall demand is calculated from the sum of the first and second control demands; and e) the overall demand thus calculated is applied to the aircraft.

Hence, since by virtue of the invention the second control demand intended to achieve the decoupling is calculated from the transfer function representative of the behavior of the aircraft, an overall decoupling is achieved, and not a decoupling limited to a limited number of couplings, as is the case for the above-mentioned known solutions.

Moreover, by virtue of the invention, the method is not dependent on or exclusive of the type of coupling or of the particular flight configuration, so that its use is not limited to specific instances of application.

Furthermore, the device in accordance with the invention for decoupling of the behavior of an aircraft, particularly a helicopter, the aircraft including at least:

a control member capable of being actuated by a pilot of the aircraft;

means for determining first control demands as a function of the actuation of the control member; and means for actuating a member controlled as a function of control demands received, is noteworthy in that it includes:

a calculating unit which, by means of a transfer function representative of the behavior of the aircraft upon the actuation of the control member, determines a second control demand capable of generating the decoupling, at least on the basis of a partial inversion of the transfer function and of that part of the transfer function not taken into account by the partial inversion; and a calculating means calculating, from the sum of the first and second control demands, an overall demand which is conveyed to the means of actuating the controlled member as a control demand.

Moreover, according to the invention, in order to calculate the second control demand, the result obtained by the partial inversion and by taking into account the non-inverted part of the transfer function is advantageously filtered and/or multiplied by a weighting factor and/or a correction factor. In addition, advantageously, a limitation is applied at least to the value of the result.

Furthermore, advantageously, in order to achieve a replication of the control margins, the control member is brought into a position representative of the overall demand.

BRIEF DESCRIPTION OF THE DRAWING

The single FIGURE of the attached drawing will give a good understanding of how the invention can be produced. This FIGURE diagrammatically illustrates a device in accordance with the invention.

DETAILED DESCRIPTION OF VARIOUS EMBODIMENT

The device 1 in accordance with the invention, and represented diagrammatically on the single FIGURE, is mounted on an aircraft, in this instance a helicopter He (represented at a reduced scale and beside the device 1, for reasons of clarity of the drawing) and is intended for decoupling of the behavior of the helicopter He.

In order to describe the present invention in detail, the elements of the helicopter He which are used for the control of a controlled member, not represented, for example the main lift and forward movement rotor or the anti-torque tail rotor, have been represented on the FIGURE, namely:

- a control member 2, for example a control column, a mini-stick or a rudder pedal, capable of being actuated by a pilot, not represented, of the helicopter He;
- means 3 for determining first control demands as a function of the actuation of the control member 2, the means 3 being associated with means 4 for conveying demands; and
- means, not represented, for example a servocontrol, linked to the means 4, for actuating the said control member as a function of control demands.

In the context of the present invention:

- in a first embodiment, the means 3 may represent the computer of an electrical flight control, and the means 4 an associated electrical link; and
- in a second embodiment, the means 3 and 4 may represent a mechanical rod linkage with an integrated jack.

It is known that the actual behavior of the helicopter He does not correspond to the expected behavior, relating to the actuation of the control member 2, by reason of the existing coupling.

This coupling can be likened to a coupling demand which is added to the demand generated by the means 3, as illustrated by an arrow CO.

The purpose of the device in accordance with the invention is to eliminate the interfering action CO generated by this coupling. In the example represented and described below, the decoupling relates to the decoupling of the roll axis of the helicopter He.

To this end, according to the invention, the device 1 includes:

- a calculating unit UC which, on the basis of a transfer function H representative of the overall behavior of the helicopter He upon actuation of the control demand 2, determines a second calculation demand Rdec capable of achieving the decoupling; and
- a calculating means 5 calculating an overall demand R which is equal to the sum of the first and second control demands and which is conveyed to the means of actuating the controlled member as a control demand.

Hence, by virtue of the invention, the second control demand Rdec makes it possible to correct the interfering action CO of the coupling, so that the actual overall behavior of the helicopter He corresponds to that obtained theoretically by the application solely of the first control demand.

More precisely, according to the invention, the transfer function H is broken down into three functions M, N and U such that H=MNU, with:

- M an identified function, of which it is possible to form the inverse;
- N an identified function, of which it is not possible to form the inverse, and representing the delays in the control system, for example; and
- U the response of the helicopter He at high frequencies, which is not dealt with for the decoupling.

According to the invention, the second control demand Rdec (decoupling demand) is calculated on the basis of:

- NR, R being the control demand for control of the roll axis in the case of the decoupling of the roll axis; and of
- $M^{-1}p$, p being a response obtained from the helicopter He, as illustrated by a link 6, for example the angular roll speed in the example in question.

To this end, the calculating unit UC includes:

- a calculating means 7 for calculating the expression NR;
- a calculating means 8 for calculating the expression $M^{-1}p$; and
- a subtractor means 9 linked to the said calculating means 7 and 8.

According to the invention, the calculating unit UC moreover includes calculating means 10 to 13 arranged successively and carrying out the following processing operations respectively:

- filtering the expression output from the subtractor means 9, by means of a filter F, in order, for example, to reduce the high-frequency part of the control signal derived by the subtractor means 9 due to the fact that the high-frequency response of the helicopter He is not taken into account, this high-frequency response being defined in the above-mentioned term U;
- multiplying this expression by a weighting factor K, lying between 0 and 1, which makes it possible to reduce the effects of the modeling errors committed in the decoupling;
- multiplying by a correction factor W called "washout", in order to eliminate the static control signals; and
- applying a limitation to the value of the term obtained from the foregoing processing operations.

Consequently, the second control demand Rdec conveyed to the calculating means 5 via a link 14 may be expressed, not taking account of the last limitation, $$Rdec = WKF(-M^{-1}p + NR)$$

It will be noted that the expression
$M^{-1}p + NR$ can be written
$M^{-1}(M(1-N)R+p)+R$, that is to say
$M^{-1}(C+p)+R$,
which makes it possible to bring to light a Smith corrector (the function C).

Clearly, the architecture of the calculating unit UC may be adapted in such a way as to allow calculation of this Smith corrector C.

According to the invention, it is obviously possible to supplement the decoupling obtained on the basis of the term Rdec by the usual control and/or axis decoupling (of the collective-pitch/roll type, for example). This is achieved, by means of a summer 15, by adding the term obtained by this usual decoupling and received via a link 16 to the above-mentioned overall demand.

The present invention applies particularly well to a helicopter He equipped with a system 17 for stability augmentation, of a known type.

In this case, the term obtained by this system 17 is subtracted by a subtractor means 18 (linked to the system 17 via a link 19) of the term Rdec in accordance with the invention.

Consequently, the direct behavior of the helicopter He equipped with the stability augmentation system 17 is not altered by the device 1 in accordance with the invention. This system 17 can also be integrated into the calculating unit UC.

It will be noted that, in addition to the above-mentioned advantages, the device 1 makes it possible to reduce:

the axis and control couplings;

the maneuvering by the helicopter He subjected to disturbances; and the maneuvering of the control member 2 which the pilot has to carry out in order to maintain the prescribed trims, when the longitudinal speed of the helicopter He changes. It is possible, moreover, to provide means, which are not represented, to bring the control member 2 into a position representative of the overall demand, for example by motoring the anchoring of the control member 2 by the decoupling control signal.

What is claimed is:

1. A method for decoupling of the behavior of an aircraft, comprising:

a) determining a first control demand that is representative of the actuation of a control member;

b) determining a transfer function that is representative of the behavior of an aircraft upon actuation of said control member;

c) determining a second control demand that is capable of generating a decoupling of the behavior of the aircraft, said second control demand being determined based at least on a partial inversion of said transfer function and a non-inverted part of said transfer function;

d) calculating an overall demand from the sum of said first and second control demands; and e) applying said overall demand to said aircraft.

2. The method as claimed in claim 1 wherein said non-inverted part of said transfer function is filtered and wherein said second control demand is calculated based on said partial inversion and said filtered, non-inverted part of said transfer function.

3. The method as claimed in claim 1, wherein said non-inverted part of said transfer function is multiplied by a weighting factor to generate a weighted non-inverted part of said transfer function and wherein said second control demand is calculated based on said partial inversion and said weighted non-inverted part of said transfer function.

4. The method as claimed in claim 1, wherein said non-inverted part of said transfer function is multiplied by a correction factor to generate a corrected non-inverted part of said transfer function and wherein said second control demand is calculated based on said partial inversion and said corrected non-inverted part of said transfer function.

5. The method as claimed in claim 1, wherein a limit value is applied to said partial inversion to generate a limited partial inversion and wherein said second control demand is calculated based on said limited partial inversion and said non-inverted part of said transfer function.

6. The method as claimed in claim 1, additionally comprising bringing said control member into a position representative of said overall demand.

7. A device for decoupling of the behavior of an aircraft, said device comprising:

a control member capable of being actuated by a pilot of the aircraft;

means for determining first control demands as a function of the actuation of said control member; and means for actuating a member controlled as a function of control demands received, said actuating means comprising:

a calculating unit which, by means of a transfer function representative of the behavior of the aircraft upon actuation of said control member, determines a second control demand that is capable of generating a decoupling of the behavior of the aircraft based at least on a partial inversion of said transfer function and a non-inverted part of said transfer function; and a calculating means calculating, from the sum of said first and second control demands, an overall demand which is conveyed to said means of actuating said controlled member as a control demand.

8. The device as claimed in claim 7, wherein said calculating unit comprises a calculating means which filters said partial inversion and calculates said second control demand based on said non-inverted part of said transfer function.

9. The device as claimed in claim 7, wherein said calculating unit comprises a calculating means which multiplies said partial inversion by a weighting factor and calculates said second control demand based on said non-inverted part of said transfer function.

10. The device as claimed in claim 7, wherein said calculating unit comprises a calculating means which multiplies said partial inversion by a correction factor and calculates said second control demand based on said non-inverted part of said transfer function.

11. The device as claimed in claim 7, wherein said calculating unit comprises a calculating means which applies a limit value at least to said partial inversion and calculates said second control demand based on said non-inverted part of said transfer function.

12. The device as claimed in claim 7, additionally comprising means for bringing said control member into a position representative of said overall demand.

* * * * *